United States Patent
Masson et al.

(10) Patent No.: US 7,912,970 B2
(45) Date of Patent: Mar. 22, 2011

(54) MANAGEMENT OF MULTIMEDIA MESSAGE SERVICE USING DEVICE MANAGEMENT TECHNIQUE

(75) Inventors: Romain Masson, Paris (FR); Pablo Hernandez, Paris (FR)

(73) Assignee: LG Electronics Inc., Seoul (KR)

( * ) Notice: Subject to any disclaimer, the term of this patent is extended or adjusted under 35 U.S.C. 154(b) by 28 days.

(21) Appl. No.: 12/298,670

(22) PCT Filed: Apr. 10, 2007

(86) PCT No.: PCT/KR2007/001736
§ 371 (c)(1),
(2), (4) Date: May 26, 2009

(87) PCT Pub. No.: WO2007/126219
PCT Pub. Date: Nov. 8, 2007

(65) Prior Publication Data
US 2010/0036919 A1    Feb. 11, 2010

Related U.S. Application Data

(60) Provisional application No. 60/795,643, filed on Apr. 28, 2006.

(51) Int. Cl.
*G06F 15/16* (2006.01)

(52) U.S. Cl. ......... 709/228; 709/227; 709/246; 709/203
(58) Field of Classification Search ............... 709/203, 709/227, 228, 246
See application file for complete search history.

(56) References Cited

U.S. PATENT DOCUMENTS

| 6,615,276 | B1 | 9/2003 | Mastrianni et al. |
| 7,100,195 | B1* | 8/2006 | Underwood ............ 726/2 |
| 7,200,627 | B2* | 4/2007 | Stickler ............ 707/999.205 |
| 2002/0184373 | A1* | 12/2002 | Maes ............ 709/228 |
| 2003/0193994 | A1* | 10/2003 | Stickler ............ 375/150 |
| 2005/0204068 | A1 | 9/2005 | Zhu et al. |
| 2006/0199568 | A1* | 9/2006 | Seo et al. ............ 455/414.1 |
| 2006/0236325 | A1* | 10/2006 | Rao et al. ............ 719/315 |

FOREIGN PATENT DOCUMENTS

EP    1 363 469 A1    11/2003

* cited by examiner

*Primary Examiner* — Phuoc Nguyen
(74) *Attorney, Agent, or Firm* — Birch, Stewart, Kolasch & Birch, LLP

(57) ABSTRACT

A technique for remotely managing a message service of a terminal (device) is disclosed. Resources or parameters, especially for parameters related to a message service, of the terminal are provided in the form of a tree to a device management server, so that the device management server can remotely manage the message service of the terminal.

12 Claims, 3 Drawing Sheets

MANAGEMENT OF MULTIMEDIA MESSAGE SERVICE USING DEVICE MANAGEMENT TECHNIQUE

BACKGROUND OF THE INVENTION

1. Field of the Invention

The present invention relates to a message service and, more particularly, to a technique for remotely managing a message service in a terminal (device).

2. Description of the Related Art

A message service is a technology allowing a user to transmit or receive a message to or from another party through a fixed line terminal or a mobile terminal. The message service includes a short message service (SMS), an enhanced message service (EMS), and a multimedia message service (MMS), etc. Recently, the MMS, which allows users to attach diverse multimedia such as text, photos, video or audio into a message and transmit and receive it, is commonly used.

In order to execute the message service in the terminal, the terminal should have a message client and various set parameters. First, in order to allow the terminal to be connected with a network, information (or set values) for connectivity should be set in the terminal. In addition, various parameters that can be adjusted, e.g., a parameter for reporting whether a recipient has received a message after the message is transmitted, can be set in the terminal.

SUMMARY OF THE INVENTION

Therefore, in order to address the above matters the various features described herein have been conceived. An aspect of the exemplary embodiments is to manage a message service of a terminal through device management (DM) techniques. Here, the DM is a technique by which a particular device (or client) (e.g., a terminal) for which DM is to be performed, provides its resources or parameters (set values) in the form of a tree or other hierarchical logical structure to a DM server, and the DM server accesses and manages the desired resource(s) or parameter(s) of the tree.

This specification provides a method for managing a message service of a terminal that may include: configuring a management object related to a message service in the form of a tree; receiving a request for providing the management object related to the message service from a DM server; and providing the tree of the management object to the DM server.

This specification also provides a method for managing a message service that may include: providing a management object related to a message service to a DM server; receiving a request for updating a parameter of the management object from the DM server; and updating the parameter of the management object according to the request.

This specification also provides a terminal that may include: a management object that comprises at least one among a first node that allows an application of the terminal to refer to a connectivity parameter for a message service and a second node that designates a URL (Uniform Resource Location) of an MMS Proxy-Relay; and an enabler that allows a device management (DM) server to access the management object.

This specification also provides a device management (DM) server that may include: a transmitting/receiving unit that receives, from a terminal, a management object related to a message service in the form of a tree (structure); and a processor that checks the received management object and selectively requests the terminal to update a parameter of the management object through the transmitting/receiving unit.

This specification also provides a server that may include: an enabler that receives a management object in the form of a tree, from a terminal, that includes at least one among a first node that allows an application of a terminal to refer to a connectivity parameter for a message service and a second node that designates a URL (Uniform Resource Location) of an MMS-Proxy-Relay, and accesses the management object.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

The exemplary embodiment of the present invention will now be described in detail with reference to the accompanying drawings.

In the attached drawings, although a terminal is shown as an example, such depicted terminal may also be referred to in terms of other expressions, such as, user equipment (UE), mobile equipment (ME), etc. In addition, the terminal can be a portable device such as a notebook computer, a mobile phone, a PDA (Personal Digital Assistant), a smart phone, a multimedia device, etc., or can be a non-portable device such as a PC or a vehicle-mounted device.

Figure 1:
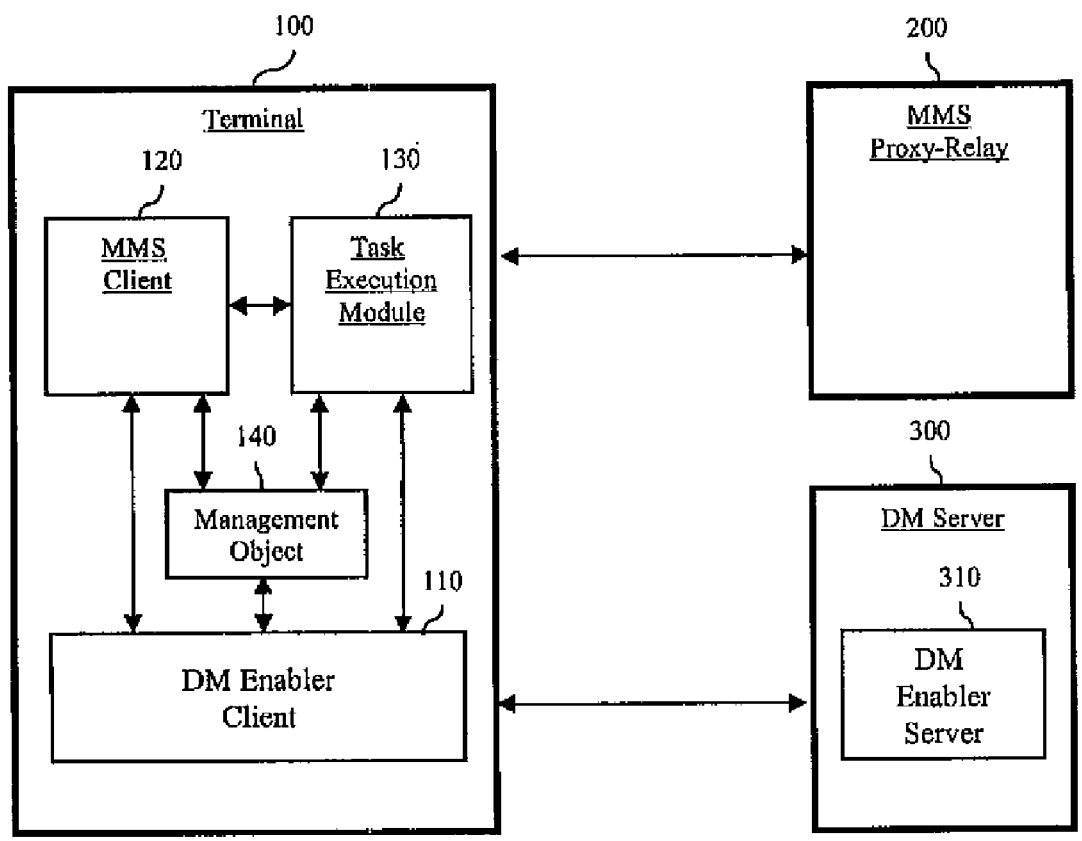
FIG. 1 is a schematic block diagram showing a terminal and a server according to an exemplary embodiment of the present invention.

FIG. 1 is a schematic block diagram showing a terminal and a server according to an exemplary embodiment of the present invention.

As shown in FIG. 1, a terminal 100 is wirelessly connected with an MMS (Multimedia Message Service) Proxy-Relay 200 for transmission and reception of a multimedia message (MM), and also wirelessly connected with a DM server 300 for management.

The terminal may include a DM enabler client 110 an MMS client 120, a task execution module 130, and a management object 140.

The DM enabler client 110 is connected with the MMS client 120, the task execution module 130, and the management object 140 to provide interface with the DM server 300 for DM. For example, the DM enable client 110 may report a state of the MMS client 120 to the DM server 300, or may receive a request for updating software of the MMS client 120 from the DM server 300. In addition, the DM enabler client 110 may provide the management object 140 in the form of a tree to the DM server 300 or receive a request for updating the management object 14 from the DM server 300.

The MMS client 120 may be an element for an MMS and may be implemented as software. The MMS client transfers a multimedia message (MM) created by a user to the MMS Proxy-Relay 200 such that the message can be transmitted to another party.

The MMS client 120 receives a message from an arbitrary originator (sender) through the MMS Proxy-Relay 200. The MMS client 120 may be connected with the DM enabler client 110 and report its state to the DM server 300 as mentioned above. In addition the MMS client 120 may be connected with the management object 140 to read a parameter of the management object 140 and drive a multimedia message service according to the parameter.

The task execution module 130 is connected with the DM enabler client 110 and the management object 140. The task execution module 130 may perform several operations for device management according to a request of the DM server 300. For example, the task execution module 130 may update several software of the terminal 100 or firmware according to a request of the DM server 300. Namely, as mentioned above, the task execution module 130 may update software of the MMS client 120 according to a request of the DM server 300.

The management object 140 may include resources of the terminal 200 or a parameter (set value). Namely, the management object 140 includes several parameters for allowing the MMS client 120 to drive the multimedia message service. Resource or parameters existing in the management object 140 is provided in the form of a tree by the DM enabler client 110 to the DM server 300, and the DM server 300 accesses the terminal 100 through the tree. In this case, the DM server 300 may access only a desired resource or parameter in the management object 140, rather than every parameter stored in the management object 140. The DM server 140 may modify, delete and update only a desired parameter. The management object 140 will now be described in detail with reference to FIG. 2.

The DM server 300 includes a DM enabler server 310. The DM enabler server 310 receives the management object in the form of a tree from the terminal 100, and accesses the management object. In addition, the DM enabler server 310 may request the terminal 100 to update a parameter of the management object.

The DM enabler server 310 may receive a report on a state from the MMS client 110 of the terminal 100. In addition, the DM enabler server 310 may request updating of an application of the terminal 100, e.g., software of the MMS client 110.

Thus far, the terminal 100 of the present disclosure has been described to include the DM enabler client 110, the MMS client 120, the task execution module 130 and the management object 140. However, but without being limited thereto, these elements may also be implemented as a combination of a processor, a communication module (also called a transmitting/receiving unit or a network interface) and a storage unit.

Likewise, the DM server 300 according to the present invention may also include a combination of a processor (not shown), a communication module (also called a transmitting/receiving unit or a network interface), and a storage unit (not shown).

Figure 2:
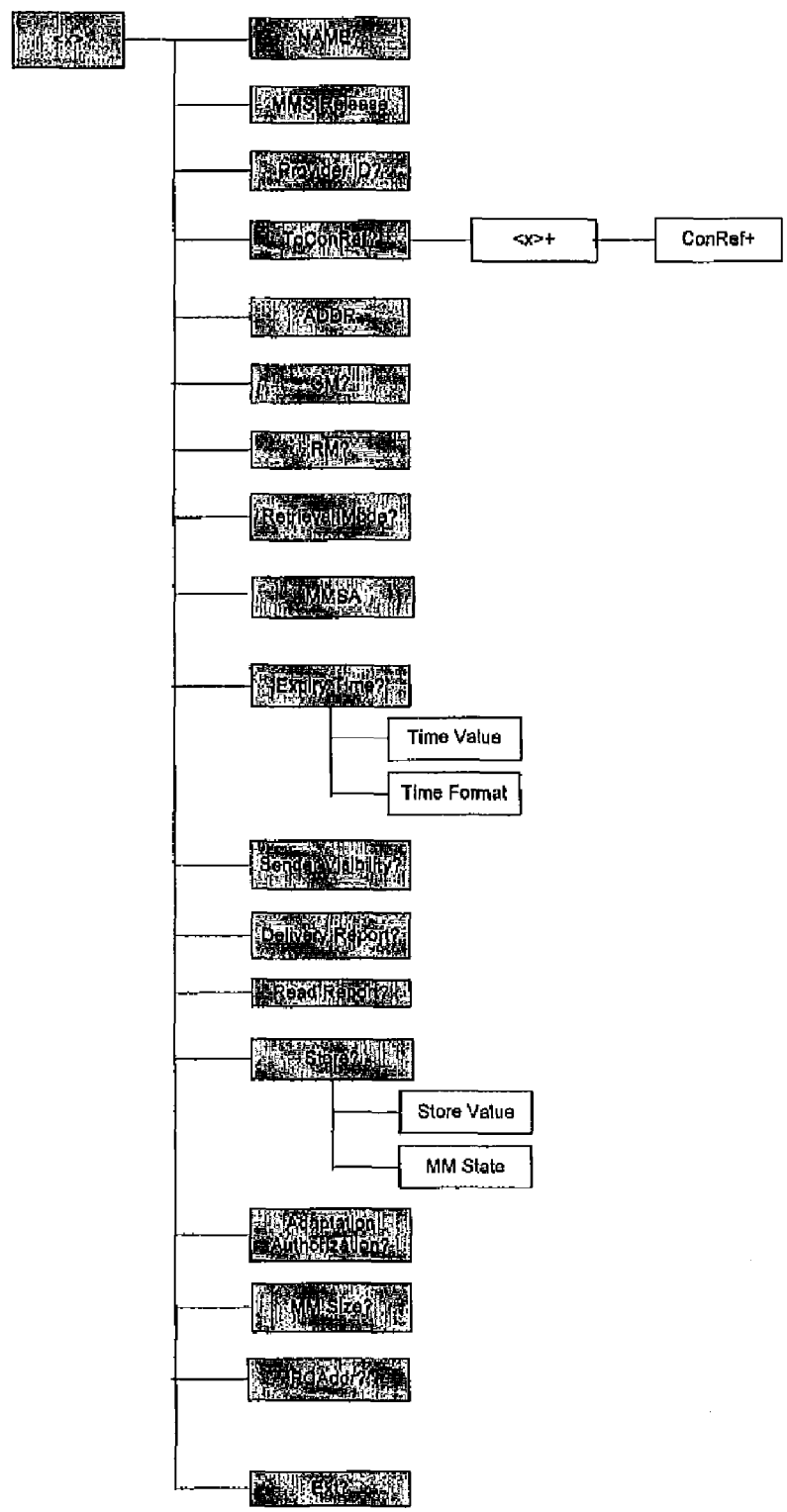
FIG. 2 is an exemplary view showing a device management object in the form of a tree according to the exemplary embodiment of the present invention.

FIG. 2 is an exemplary view showing a device management object in the form of a tree according to the exemplary embodiment of the present invention.

As shown in FIG. 2, a management object including several parameters for a multimedia message service may have the form of a tree. The management object will now be described in detail.

a) A <x> node serves as a place holder for the multimedia message service in the management object 140. There may exist one or more <x> nodes.

b) A 'NAME' node includes the name of the MMS Proxy-Relay 200 that can be read by a user. Thus, the format of the 'Name' node comprises letters (text). One or more 'NAME' nodes may exist in the management object.

c) A 'MMS Release' node indicates a version of a multimedia message service supported by the MMS client 120. The format of the 'MMS Release' node comprises letters (text).

d) A 'Provider-ID' node indicates an identifier of a provider of the multimedia message service. The format of this node comprises letters (text).

e) A 'ToConRef' node allows an application of the terminal 100, e.g., the MMS client 100, to refer to a connectivity parameter for the multimedia message service. The 'ToConRef' node includes a <X>+ node. The <x>+ node serves as a place holder for the connectivity parameter. One or more <x>+ nodes may be included in the 'ToConfRef' node. A 'ConRef' node may be included at a lower position of the <x>+ node. The 'ConRef' node specifies a specific linkage to the connectivity parameter. The 'ConfRef' node points to the right connectivity identity, NAP ID and a WAP gateway.

f) An 'ADDR' node specifies a URL of the MMS Proxy-Relay 200.

g) A 'CM' node (also called CreMode) specifies a creation mode supported by the MMS client 120. Namely, the 'CM' node designates a mode used for creating and transmitting a new multimedia message (MM). In other words, this leaf node specifies the creation mode used for creation and submission of a new multimedia message. This mode includes three types of modes: R (RESTRICTED), W (WARNING) and F (FREE) modes. In the RESTRICTED mode (R), the terminal may only create multimedia messages (MMs) belonging to a Core MM Content Domain. In WARNING mode (W), a terminal may guide the user to create and submit only multimedia messages (MMs) belonging to the Core MM Content Domain. In other words, in the WARNING mode, a user is informed that the terminal 100 may generate or transmit only multimedia messages belonging to a particular domain (e.g., belonging to the Core MM Content Domain).

In the FREE mode (F), the terminal 100 may allow the user to add any content to the multimedia message.

h) A 'RM' node designates a re-submission mode supported by the MMS client 120. Namely, this leaf node specifies the re-submission mode used for submission of an earlier retrieved multimedia message). In other words, the 'RM' node designates the re-submission mode used for submission of an earlier restricted multimedia message. The 'RM' node may specify three types of modes: R (RESTRICTED) mode, W (WARNING) mode and F (FREE) mode. Here, the re-submission follows the creation mode when the creation mode is set to WARNING or FREE. In other words, the re-submission mode follows the transmission mode when the transmission mode is set to the WARNING mode or the FREE mode. In the RESTRICTED mode (R), the terminal 100 may only re-submit multimedia messages belonging to the Core MM Content Domain. In other words, the terminal 100 may only re-transmit multimedia messages belonging to the core MM content domain. In the WARNING mode (W), the terminal 100 may guide the user to re-submit only multimedia messages belonging to the core MM Content Domain). In other words, the terminal 100 informs the user that only the multimedia messages belonging to the core MM content domain can be re-transmitted. In the FREE mode, the terminal may allow the user to re-transmit any earlier retrieved MM.

i) A 'Retrieval Mode' node specifies a method that the MMS client receives (retrieves) the multimedia message. The 'Retrieval Mode' node may specify one of the Retrieval Mode, Automatic mode or Manual mode. In the Manual mode, a user confirmation is first made before receiving a message.

j) A 'MMSA' node indicates an interface state between the MMS client 110 and a different application of the terminal 100.

k) An 'Expiry Time' node indicates expiry time information related to transmission of a message. The 'Expiry Time' node includes a 'Time Value' node and a 'Time Formation' node. The 'Expiry Time'/'Time Value' node designates (specifies) a time value indicating until when a message transmitted by the MMS client 110 can be stored in the MMS Proxy-Relay 200 or when it should be deleted. The 'Expiry Time'/'Time Format' node designates the format of a time value designated in the 'Time Value' node. Namely, The 'Expiry Time'/'Time Format' node has an absolute or relative value.

l) A 'Sender Visibility' node allows an identity of a sender to be provided to a recipient or to be hidden. This node has a value of hide or show.

m) A 'Delivery Report' node designates whether to report the sender whether or not the recipient has received a message. The value of the 'Delivery Report' node can be designated by Yes or No.

n) A 'Read Report' node designates whether to report to the sender whether or not the recipient has read the message. The value of the 'Read Report' node can be designated by 'yes' or 'no'.

o) A 'Store' node indicates information related to storing the message in a multimedia message box. The 'Store' node includes a 'Store Value' node and a 'MM State' node. The 'Store Value' node of the 'Store' node designates whether or not a message which has been transmitted is stored in the multimedia message box. The 'MM State' node of the 'Store' node indicates a state of the stored message. The 'MM State' node may indicate a state of being drafted, a sent state, a new state, a received state (retrieved state) or forwarded state).

p) An 'Adaptation Authorization' node indicates whether the multimedia message can be converted (i.e., the 'Adaptation Authorization' node specifies the X-Mms-Adaptation-Allowed field of the send request, e.g., it indicates whether the MMS client authorizes an MM to be adapted or not).

q) The 'MM Size' node designates a maximum allowed size of the multimedia message.

4) A 'PCAddr' node (or an address of Postcard service node) designates an address of a postcard (i.e., the 'PCaddr' node defines an address for postcard service to be used as the recipient of multimedia message that includes a postcard). Here, the postcard service refers to allowing the user to add a previously defined phrase or image at a lower end portion of the message when sending the message. The postcard service is also called vCard service.

In the above description, the management object with respect to the multimedia message is shown in the form of a tree. The above-described nodes may not be all necessarily included but can be reduced, extended or changed by a person in the art. In addition, the names of the above-described nodes can be changed by the person in the art.

Figure 3:
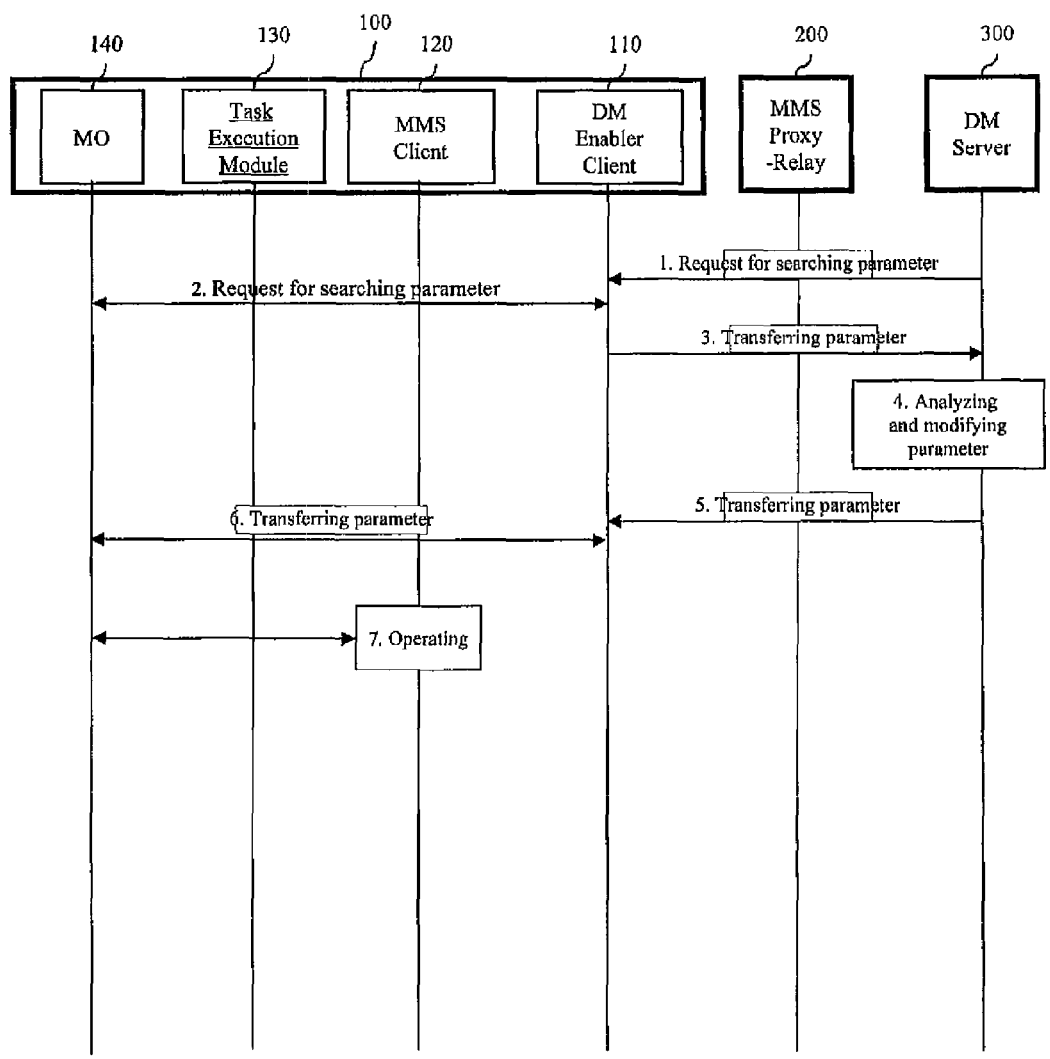
FIG. 3 is an exemplary view showing the process according to the exemplary embodiment of the present invention.

FIG. 3 is an exemplary view showing the process according to the exemplary embodiment of the present invention.

As shown in FIG. 3, in the DM method according to the present invention, the DM server 300 may search and modify a parameter related to the multimedia service of the terminal 100.

1) The DM server 300 requests the DM enabler client 110 of the terminal 100 to search a parameter.

2) The DM enabler client 110 accesses the management object 140 to search the parameter requested by the server 300.

3) The DM enabler client 110 provides the parameter in the form of a tree to the DM server 300.

4) Then, the DM server 300 analyzes the provided parameter and properly modifies it.

5) The DM server 300 transfers the modified parameter to the DM enabler client 110 of the terminal 100.

6) The DM enabler client 110 updates the received parameter to the management object 140.

7) Then, the MMS client 120 operates according to the updated parameter in the management object 140.

As so far described, the method according to the present invention can be implemented by software, hardware and their combination. For example, the method according to the present invention can be stored in a storage medium (e.g., an internal memory of a mobile terminal, a flash memory, a hard disk, etc.) and can be implemented as codes and command languages in a software program that can be executed by a processor (e.g., an internal microprocessor of the mobile terminal).

Because the resources or parameters of the terminal, in particularly, the parameters related to the message service, can be provided in the form of a tree to the DM server, the DM server can remotely manage the message service of the terminal. In addition, because only resources or parameters desired by the DM server among all the resources and parameters of the terminal, is provided to the DM server and the DM server can adjust them, the network load and communication costs can be reduced.

In the above description, the multimedia message is taken as an example, but without being limited thereto, the present invention can be also applicable to a short message service (SMS), an enhanced message service (EMS), etc.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a multimedia message service (MMS) client that supports a multimedia message service (MMS) for transmission and reception of multimedia messages via a multimedia message service (MMS) proxy-relay;
a task execution module cooperating with the MMS client to support execution of tasks related to the MMS;
a management object entity that contains a plurality of management objects related to the MMS, the management objects being configured in a device management (DM) tree or other logical hierarchy format, the management object entity being accessible by the MMS client and the task execution module; and
a device management (DM) client, cooperating with the MMS client, the task execution module, and the management object entity, and connected with a device management (DM) server in order to perform device management (DM) operations related to the MMS using the management objects in the DM tree or other logical hierarchy format, the DM operations being performed by:

receiving, from the DM server, a request for searching at least one parameter related to the management objects, accessing the at least one parameter from the management object entity, transferring, to the DM server, the at least one parameter in a form of the DM tree or other logical hierarchy format, receiving, from the DM server, a modified parameter after the DM server performs modification of the at least one parameter, and transferring the modified parameter to the management object entity for updating thereof to allow the MMS client to operate according to the modified parameter;

wherein the DM tree or other logical hierarchy format is comprised of nodes related to supporting the MMS including:

a 'ToConRef' node that allows the MMS client to refer to a connectivity parameter for the MMS, a 'CM' node that specifies a creation mode supported by the MMS client that is used for creating and transmitting a new multimedia message, whereby the creation mode includes a Restricted mode in which a user of the terminal is only permitted to create and submit multimedia messages belonging to a Core MM Content Domain, a Warning mode in which the user is guided by the terminal to create and submit only multimedia messages belonging to the Core MM Content Domain, and a Free mode in which the user is permitted to add content to the multimedia message, and an 'RM' node that designates a re-submission mode supported by the MMS client and used for submission of an earlier retrieved or restricted multimedia message, whereby the re-submission mode follows the creation mode that is set to either the Warning mode or the Free mode.

2. The mobile terminal of claim 1, wherein the 'RM' node comprises:

a second Restricted mode in which a user of the terminal is only permitted to create and submit multimedia messages belonging to a Core MM Content Domain;

a second Warning mode in which the user is guided by the terminal to create and submit only multimedia messages belonging to the Core MM Content Domain; and a second Free mode in which the user is permitted to add content to the multimedia message.

3. The mobile terminal of claim 2, wherein the DM tree or other logical hierarchy format further comprises:

a 'Retrieval' node that specifies a method that the MMS client retrieves the multimedia message, and includes a Retrieval mode, an Automatic mode, and a Manual mode that performs user confirmation before receiving the multimedia message;

an 'MMSA' node that indicates an interface state between the MMS client and a different application of the terminal; and an 'Expiry Time' node that indicates expiry time information related to transmission of the multimedia message.

4. The mobile terminal of claim 3, wherein the DM tree or other logical hierarchy format further comprises:

a 'Sender Visibility' node that allows an identity of a sender to be provided to a recipient or to be hidden from the recipient;

a 'Delivery Report' node that designates whether to report to the sender about whether or not the recipient has received the multimedia message; and a 'Read Report' node that designates whether to report to the sender about whether or not the recipient has read the multimedia message.

5. The mobile terminal of claim 4, wherein the DM tree or other logical hierarchy format further comprises:

a 'Store' node that indicates information related to storing the multimedia message in a multimedia message box; and an 'Adaptation Authorization' node that indicates whether the multimedia message is converted or adapted.

6. The mobile terminal of claim 5, wherein the DM tree or other logical hierarchy format further comprises:

a 'MM Size' node that designates a maximum allowed size of the multimedia message; and a 'PCAddr' node that designates an address of a postcard service to be used to indicate receipt of the multimedia message by allowing the user to add a previously defined phrase of image at a lower end portion of the multimedia message to be sent.

7. A method of handling device management (DM) operations related to a multimedia message service (MMS) between a mobile terminal and a device management (DM) server, the method performed by the mobile terminal and comprising:

receiving, from the DM server, a request for searching at least one parameter related to management objects related to the MMS, the management objects being configured in a device management (DM) tree or other logical hierarchy format;

accessing the at least one parameter from a management object entity in the mobile terminal;

transferring, to the DM server, the at least one parameter in a form of the DM tree or other logical hierarchy format;

receiving, from the DM server, a modified parameter after the DM server performs modification of the at least one parameter; and transferring the modified parameter to the management object entity for updating thereof to allow a MMS client in the mobile terminal to operate according to the modified parameter, wherein the DM tree or other logical hierarchy format is comprised of nodes related to supporting the MMS including:

a 'ToConRef' node that allows the MMS client to refer to a connectivity parameter for the MMS, a 'CM' node that specifies a creation mode supported by the MMS client that is used for creating and transmitting a new multimedia message, whereby the creation mode includes a Restricted mode in which a user of the terminal is only permitted to create and submit multimedia messages belonging to a Core MM Content Domain, a Warning mode in which the user is guided by the terminal to create and submit only multimedia messages belonging to the Core MM Content Domain, and a Free mode in which the user is permitted to add content to the multimedia message, and an 'RM' node that designates a re-submission mode supported by the MMS client and used for submission of an earlier retrieved or restricted multimedia message, whereby the re-submission mode follows the creation mode that is set to either the Warning mode or the Free mode.

8. The method of claim 7, wherein the 'RM' node comprises:
   a second Restricted mode in which a user of the terminal is only permitted to create and submit multimedia messages belonging to a Core MM Content Domain;
   a second Warning mode in which the user is guided by the terminal to create and submit only multimedia messages belonging to the Core MM Content Domain; and
   a second Free mode in which the user is permitted to add content to the multimedia message.

9. The method of claim 8, wherein the DM tree or other logical hierarchy format further comprises:
   a 'Retrieval' node that specifies a method that the MMS client retrieves the multimedia message, and includes a Retrieval mode, an Automatic mode, and a Manual mode that performs user confirmation before receiving the multimedia message;
   an 'MMSA' node that indicates an interface state between the MMS client and a different application of the terminal; and
   an 'Expiry Time' node that indicates expiry time information related to transmission of the multimedia message.

10. The method of claim 9, wherein the DM tree or other logical hierarchy format further comprises:
    a 'Sender Visibility' node that allows an identity of a sender to be provided to a recipient or to be hidden from the recipient;
    a 'Delivery Report' node that designates whether to report to the sender about whether or not the recipient has received the multimedia message; and
    a 'Read Report' node that designates whether to report to the sender about whether or not the recipient has read the multimedia message.

11. The method of claim 10, wherein the DM tree or other logical hierarchy format further comprises:
    a 'Store' node that indicates information related to storing the multimedia message in a multimedia message box; and
    an 'Adaptation Authorization' node that indicates whether the multimedia message is converted or adapted.

12. The method of claim 11, wherein the DM tree or other logical hierarchy format further comprises:
    a 'MM Size' node that designates a maximum allowed size of the multimedia message; and a 'PCAddr' node that designates an address of a postcard service to be used to indicate receipt of the multimedia message by allowing the user to add a previously defined phrase of image at a lower end portion of the multimedia message to be sent.

\* \* \* \* \*